Sept. 8, 1964    W. R. SANDERSON    3,147,681
CASSETTE FOR PHOTOGRAPHIC CAMERAS
Filed May 17, 1961    2 Sheets-Sheet 1

INVENTOR.
WILLIAM R. SANDERSON
BY
Attorney

Sept. 8, 1964  W. R. SANDERSON  3,147,681
CASSETTE FOR PHOTOGRAPHIC CAMERAS
Filed May 17, 1961  2 Sheets-Sheet 2

INVENTOR.
WILLIAM R. SANDERSON
BY
Attorney

United States Patent Office 3,147,681
Patented Sept. 8, 1964

3,147,681
CASSETTE FOR PHOTOGRAPHIC CAMERAS
William R. Sanderson, Irondequoit, N.Y., assignor to Graflex, Inc., Rochester, N.Y., a corporation of Delaware
Filed May 17, 1961, Ser. No. 110,712
2 Claims. (Cl. 95—31)

The present invention relates to a film-holding cartridge or cassette for photographic cameras, and more particularly to a film-holding cartridge or cassette for cameras such as are used in making photographic records of the readings of meters.

Telephone companies are accustomed to meter the number of calls made by customers, particularly in the case of commercial telephone users, and to bill these customers periodically from the meter readings. It has been found, however, that errors occur when written records are made of meter readings. Errors may be made in reading the meters, and/or in recording the readings on a report sheet, and/or in transcribing the readings of the report sheet to the monthly bills. If an error is made in recording the reading, though, there is no method of checking this error, because after recording the reading the meter is either reset to zero, or will have recorded additional calls. For these reasons, special cameras have been developed to photograph telephone call meters and record their readings. The photographs obviate any possibility of error in recording the readings. They provide, moveover, a permanent record of the readings for as long a period as desired, so that should an error be made in transcribing the record to a bill, the actual reading can be checked quickly from the photograph.

A camera of the type referred to is illustrated in the U.S. patent to Gorey No. 2,874,623, granted February 24, 1959.

One object of the present invention is to provide a supply cassette for a camera, and particularly for a camera of the character described, which will be of relatively low cost. To this end, another object of the invention is to provide a disposable supply cassette for such a photographic camera.

Another object of the invention is to provide a disposable supply cassette, where the end walls or plugs of the cassette form bearings for support of the cassette in a camera.

A further object of the invention is to provide a cassette of the character described in which the end walls of the cassette are keyed for proper orientation of the cassette in a camera.

Another object of the invention is to provide a cassette of the character described wherein the end walls provide a labyrinth light seal.

Another object of the invention is to provide a cassette in which the inside surface of the cassette locates the photosensitive paper or film sidewise.

Another object of the invention is to provide a cassette in which the photosensitive paper may be disposed so that it can shift slightly along the axis of the cassette to eliminate any irregularities of spooling.

Another object of the invention is to provide a cassette of the character described which needs no spool or core, so that the projecting spool ends, which are conventionally required are eliminated, thereby obviating need for special packing to prevent shocks, received in shipping, from displacing the photosensitive paper edgewise with resulting problems in tracking through the camera, or even complete jams.

Still another object of the invention is to provide a cassette of the character described wherein the photosensitive material, such as photosensitive paper, may be disposed in the cassette without being wrapped upon a spool or core.

A still further object of the invention is to provide a cassette in which spirally wound photosensitive material will spring outward and hug the inside wall of the cassette to eliminate any sharp bend in the material as it feeds out of the mouth of the cassette even when the cassette is nearly empty.

Other objects of the invention will be apparent hereinafter from the specification, particularly when read in conjunction with the accompanying drawings, and from the recital of the appended claims.

Figure 1:
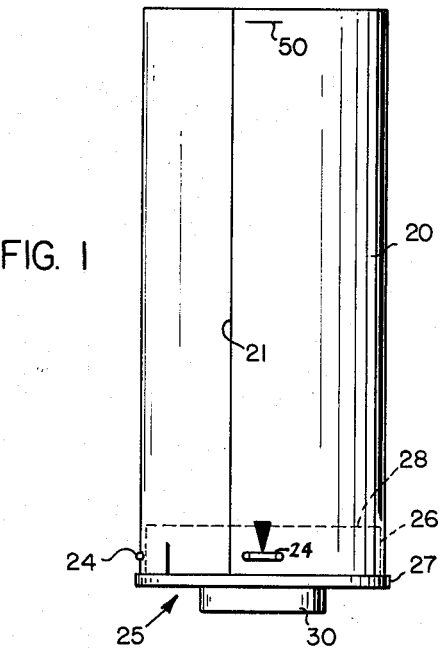
FIG. 1 is a side elevation showing a cassette made according to one embodiment of this invention at a preliminary stage in the assembly of the same.

A cassette made according to the present invention has a side wall formed of a disposable material such as paper wound into a spiral of slightly more than one convolution so that there is a slight overlap at its ends; and it has two plugs for closing the two ends of the cassette, and fastening means for securing the ends of the paper sidewall to the plugs so as to hold the cassette in assembled position.

Referring now to the drawings by numerals of reference, 20 denotes the side wall of the cassette. This consists of a single sheet of paper, for instance, wound into a spiral with the outside end 21 of the paper overlapping the inside end 22 (FIG. 2) thereof.

Figure 7:
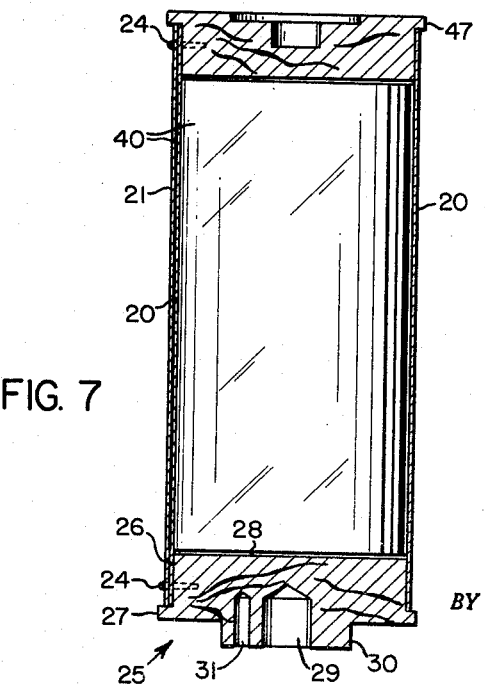
FIG. 7 is an axial secional view of the closed cassette with the film assembled therein.

In the first stage of assembly of the cassette, the coiled paper 20 is fastened by suitable means, for instance, wire staples 24 (FIG. 1), to the hub portion 26 of a wooden plug 25. This plug has a flange 27 intermediate its ends against which one end of the rolled paper 20 seats. The hub portion 26 lies at one side of this flange; and a hub portion 30 of reduced diameter (FIG. 7) lies at the other side of the flange. The flange projects radially beyond both hub portions. The plug has a plane upper face 28; and it has a central hole or recess 29 in it which serves as a bearing for support of the assembled cassette in the camera. The plug 26 also has means for locating the cassette in proper orientation in the camera. In the instance shown, this means comprises a hole 31 in the plug, which is adapted to receive a pin that is fastened to the camera case.

Figure 2:
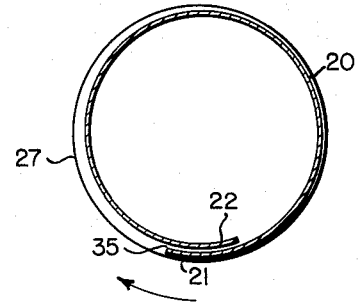
FIG. 2 is a transverse section through the cassette at this stage.
Figure 4:
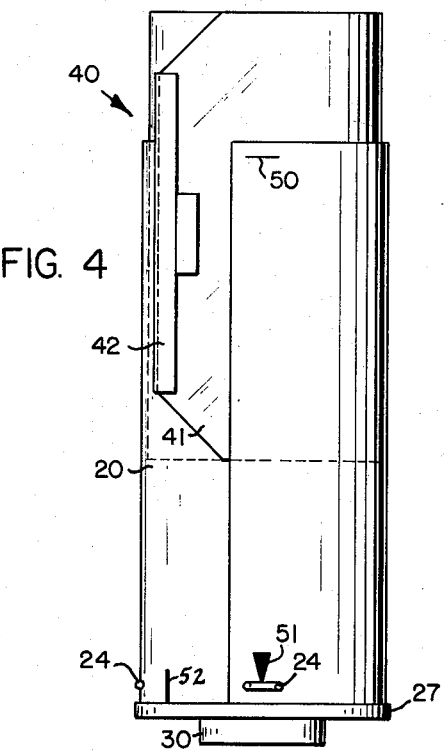
FIG. 4 is a side elevation illustrating how the photosensitive material is assembled into the cassette.
Figure 5:
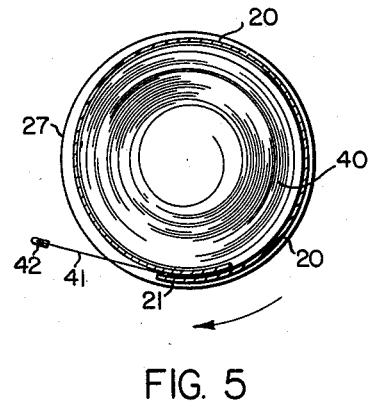
FIG. 5 is a transverse section showing the cassette with the photosensitive material assembled therein.
Figure 6:
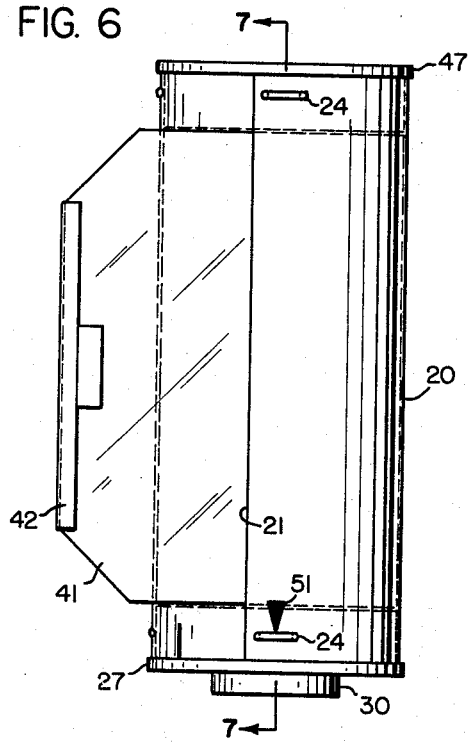
FIG. 6 is a side elevation showing the film assembled in the cassette and the upper end of the cassette closed so that the cassette and film are now ready for use.
Figure 8:
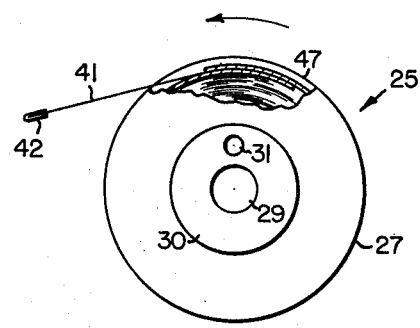
FIG. 8 is a bottom plan view of the closed cassette, partly broken away.

The overlapping ends of the paper side wall provide and bound a gap or mouth 35 (FIG. 2). In use, a roll of photosensitive paper or film 40 is inserted into the cassette by passing the lead end 41 (FIGS. 4 and 5) of the roll through the gap or mouth 35 and pushing the roll axially downwardly into the open-topped cassette until the roll bottoms on the plane upper face 28 of the plug 26. FIG. 4 shows the roll in the process of being inserted into the open-topped cassette. The roll of photosensitive paper, which is illustrated in this figure, has a thin metallic strip 42 secured to its lead edge 40, and may be of the type disclosed in the U.S. patent to Steiner No. 2,702,673, granted February 22, 1955. Such film may be used with a take-up cassette such as disclosed in this Steiner patent.

Figure 3:
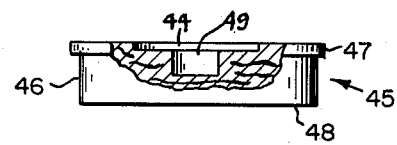
FIG. 3 is a view, partly in section, of the plug for closing the upper end of the cassette after assembly of a roll of photosensitive film or paper therein.

After the roll of film has been inserted into the open cassette, the top of the cassette is closed by pushing into it a plug such as denoted at 45 in FIG. 3. This plug has a hub portion 46, to which the upper end of the paper side wall 20 of the cassette is fastened by suitable means, such as wire staples 24. This plug has a peripheral flange 47 against which the upper edge of the paper wall 20 seats; and it has a plane lower face which serves to locate the photosensitive paper sidewise in the cassette. It has a central recess 44, and is counterbored at 49. The counterbore 49 serves to receive a centering pin on the camera; and the recess 44 provides clearance relative to an adjacent part of the camera.

Figure 9:
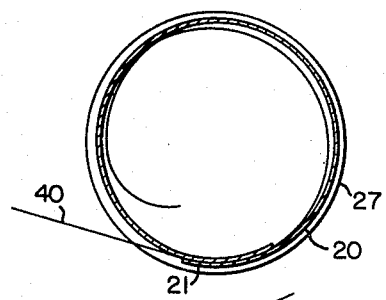
FIG. 9 is a transverse sectional view showing how the photosensintive material hugs the inside wall of the cassette even to the end of the material.

In use, as the paper or film is fed out of the cassette to the pick-up spool or cassette of the camera, the spirally rolled film or paper 40 expands outwardly hugging the inside wall of the cassette, so that even when the roll is practically completely fed out of the supply cassette, the paper will hug the outer wall of the cassette, as shown in FIG. 9, eliminating any sharp bend in the photosensitive material at the mouth of the cassette, which occurs when the film is secured to a spool or core. The paper clock-springs outward constantly.

The end plugs 25 and 45 have several functions. Their holes 29 and 49 serve as bearings for supporting the cassette in the camera. The hole or locating part 31 serves to orient the cassette properly in the camera. Their flanges 27 and 47 provide light seals at the ends of the cassette. Their inside surfaces 28 and 48 serve to locate the photosensitive paper endwise. The plugs provide bodies into which to drive the staples which secure the cassette together.

The paper outer wrap 20 is, of course, relatively cheap as compared to the metal walls heretofore required for cassettes; and because of its thinness the paper provides at the overlap resiliency and a close fit so as to seal the film or photosensitive paper around the lead edge of the photosensitive material. The paper outer wrap 20 is preferably provided, as shown, with information helpful to the person assembling the cassette and to the person loading the camera. Thus, marks 50 (FIG. 1) may be provided around the outside upper end of the paper outer wrap 20 to indicate the points where the staples should be placed, and a mark 51 (FIG. 4) may be provided near the lower end of the outer wrap to indicate the location of the hole 31. The arrow 51 indicates the position of the key pin or hole both for assembly and loading. The heavy axial lines 52 are for use in the assembly fixture.

The use of photosensitive paper without a core has several advantages. As already pointed out, the paper clock-springs outward and hugs the inside of the paper side wall 20 of the cassette, eliminating any sharp bend of the photosensitive material even when the cassette is nearly empty. Moreover, the photosensitive paper can shift slightly along the axis of its coil to eliminate any irregularities of spooling, which has been a source of much trouble prior to this. Furthermore, the elimination of the projecting spool ends eliminates need for special packing to prevent shocks received in shipping from displacing the paper edgewise with the resulting problems in tracking through the camera, or even of complete jams.

While the cassette has been described as having a paper side wall and wooden end plugs, obviously other materials, such as plastics, might be used instead for these parts. The paper and wood have the advantage of cheapness, however, and that is a major factor as regards disposability of the cassette after use.

While the invention has been illustrated in connection with a specific embodiment thereof, then, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. A disposable cassette for photographic cameras comprising a single thin sheet wound into a spiral coil of slightly more than one convolution, and a pair of plugs spaced from one another axially of the spiral, each of said plugs having a rigid hub portion to which one lateral edge of the sheet is fastened, and each of said plugs having axially-aligned recesses in its outer surface which together constitute bearings for the cassette when the cassette is mounted in a camera, the inside surfaces of the two plugs being circular parallel plane surfaces which extend inside the sheet from side to side thereof to support and locate a roll of photosensitive material sidewise in the cassette, the coiled sheet constituting the side wall of the cassette, the overlapping portions of the coiled sheet forming and bounding the mouth of the cassette through which photosensitive material may be fed, and the plugs constituting the ends of the cassette.

2. A disposable cassette as claimed in claim 1, wherein the sheet is a sheet of paper, and the plugs are wooden, and the paper is fastened to the plugs by wire staples.

References Cited in the file of this patent
UNITED STATES PATENTS

| | | |
|---|---|---|
| 1,513,930 | Ray | Nov. 4, 1924 |
| 1,794,426 | Taylor | Mar. 3, 1931 |
| 2,017,160 | Parker | Oct. 15, 1935 |
| 2,030,040 | Hynes et al. | Feb. 4, 1936 |
| 2,032,213 | Howell | Feb. 25, 1936 |
| 2,464,278 | Wilson | Mar. 15, 1949 |
| 2,482,869 | Polglase et al. | Sept. 27, 1949 |
| 2,544,455 | Goulding | Mar. 6, 1951 |
| 2,571,796 | Ulmschneider et al. | Oct. 16, 1951 |